(12) United States Patent
Czerney et al.

(10) Patent No.: US 7,563,907 B2
(45) Date of Patent: Jul. 21, 2009

(54) COMPOUNDS BASED ON POLYMETHINES

(75) Inventors: Peter Czerney, Weimar (DE); Matthias Wenzel, Jena (DE); Bernd Schweder, Jena (DE); Frank Lehmann, Jena (DE)

(73) Assignee: Dyomics GmBH (DE)

( * ) Notice: Subject to any disclaimer, the term of this patent is extended or adjusted under 35 U.S.C. 154(b) by 906 days.

(21) Appl. No.: 10/846,789

(22) Filed: May 14, 2004

(65) Prior Publication Data

US 2004/0260093 A1  Dec. 23, 2004

Related U.S. Application Data

(63) Continuation-in-part of application No. 10/310,206, filed on Dec. 5, 2002, now abandoned.

(30) Foreign Application Priority Data

Nov. 28, 2003 (DE) ................................ 103 56 130

(51) Int. Cl.
*C07D 405/06* (2006.01)
(52) U.S. Cl. ........................ 548/463; 548/454
(58) Field of Classification Search ................ 548/454, 548/463
See application file for complete search history.

(56) References Cited

U.S. PATENT DOCUMENTS

| 4,886,744 | A | 12/1989 | Arnost et al. |
| 5,627,027 | A | 5/1997 | Waggoner |

OTHER PUBLICATIONS

Bertollino, et al. "Novel Heptamethine Cyanine Dyes with Large Stokes' Shift for Biological Applications in the Near Infrared", J. Fluoresc. vol. 16, pp. 221-225 (2006).*
Ashwell, G.J. et al. "Improved Second-Harmonic Generation from Langmuir-Blodgett Films," Langmuir, 1998, vol. 14, pp. 1525-1527.
R.M. Abd El-Aal and A.I.M. Koraierm. "Synthesis, Absorption Spectra Studies and Biological Activity of Some Novel Conjugated Dyes," J. of the Chinese Chem. Soc., 2000. vol 47. pp. 389-395.
Lehmann, F. et al. "Synthesis of Amphiphilic Styrylpyridinium and Styrylquinolinium Hemicyanines and Merocyanines," Dyes and Pigments, 1995, vol. 29(1), pp. 85-94.

* cited by examiner

*Primary Examiner*—Kamal A Saeed
*Assistant Examiner*—Jason M Nolan
(74) *Attorney, Agent, or Firm*—Andrus, Sceales, Starke & Sawall, LLP

(57) ABSTRACT

The invention relates to fluorescent dyes (fluorophores) based on polymethines for use in optical measurement and detection procedures, in particular those employing fluorescence, for example in medicine, in pharmacology and in the biological, materials and environmental sciences. The objective was to create fluorophores based on polymethines that have a large Stokes shift, high photostability, long storage life and a high fluorescent quantum yield, and that can be excited in the simplest possible manner by white-light sources or laser radiation in the UV, visible or NIR spectral region. According to the invention dyes on the basis of polymethines having the general formulas I, II or III

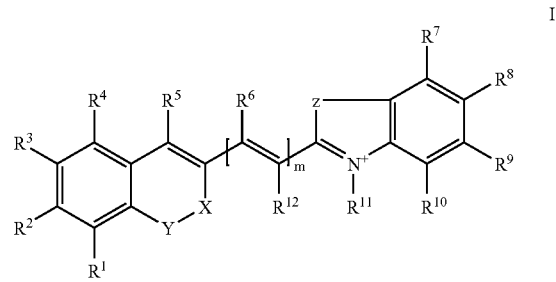

m = 0, 1, 2, 3

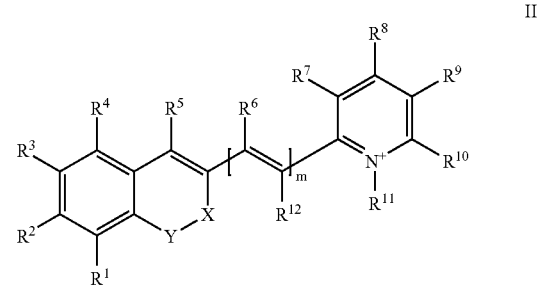

m = 0, 1, 2, 3

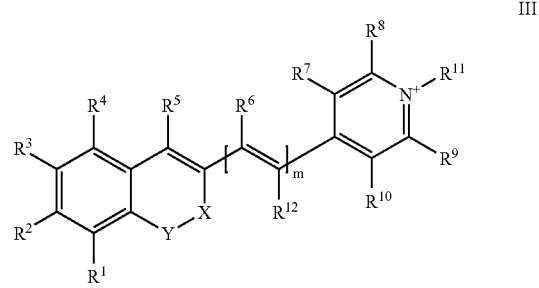

m = 0, 1, 2, 3 are employed.

12 Claims, No Drawings

COMPOUNDS BASED ON POLYMETHINES

CROSS-REFERENCE TO RELATED APPLICATION

This application is a continuation-in-part of application Ser. No. 10/310,206, filed Dec. 5, 2002, by inventors Czerney, et al., currently pending.

This application also claims priority under the Paris Convention to DE application Ser. No. 103 56 130.7, filed with the German Patent Office on Nov. 28, 2003.

FIELD OF THE INVENTION

BACKGROUND OF INVENTION

The invention relates to fluorescent dyes (fluorophores) based on polymethines for use in optical measurement and detection procedures, in particular those employing fluorescence. Typical applications exploit the reaction of dye-labelled antigens, antibodies or DNA segments with the respective complementary species. With such methods it is possible to measure, e.g., enzyme kinetics, receptor-ligand interactions and the kinetics of nucleic-acid hybridization. Furthermore, the claimed fluorophores are of interest for the pharmacological characterization of receptors or agents.

Possible uses associated therewith exist, for example, in medicine and pharmacology, in the biological and materials sciences, in environmental monitoring and the detection of organic and inorganic microsamples present in natural surroundings and in technology.

Whereas cyanines with a Stokes shift of 20-40 nm have long been known as fluorescent markers (Cy3, Cy5, U.S. Pat. No. 5,627,027), as yet there are only a few fluorophores with a large Stokes shift. Typical examples of these are the markers derived from the laser dye DCM, with absorption maxima at 481 nm and emission maxima at 644 nm, which are claimed in the patent U.S. Pat. No. 4,886,744.

Different stilbenes with large Stoke's shift have been previously described by F. Lehmann et al. in "Dyes and Pigments", Elsevier Applied Science Publishers, vol. 29, no. 1, 1995, pages 85-94 as well as by G. J. Ashwell et al. in the "Journal of Materials Chemistry", Cambridge, vol. 11, no. 5, 2001, pages 1345-50. Hydroxy substituted-stilbenes with a lactone bridging have been published by R. M. Abd El-Aal et al. in the "Journal of the Chinese Chemical Society", Taipei, vol. 47, no. 2, 2000, pages 389-95. Further to be taken into consideration are the different stilbenes published by Czerney et al. in "Sensors and Actuators B", Elsevier, Lausanne, vol. 39, no. 1-3, 1997, pages 395-400 and in U.S. Pat. No. 6,096,794.

Common to all compounds is that they do not have any reactive group which permits covalent binding, for example, biomolecules. A further disadvantage is that the solubility in water or aqueous media for applications in bioanalysis is not sufficient.

Whereas the compounds disclosed in the Japanese unexamined patent specification JP 07-234 504 contain an —SO3-group, they have a completely different structure than the compounds I to III according to the invention. They are distinguished from the latter in that they are not suited for applications in bioanalysis and diagnosis because they lack a function which enables a covalent binding on biomolecules.

SUMMARY OF INVENTION

The invention is directed towards the objective of creating fluorescent markers on the basis of polymethines that have an adjustable large Stokes shift which can be adjusted as desired to the requirements of the optical detection system, with high photostability, long storage life and a high fluorescence quantum yield. The compounds of the invention have the advantage that the Stokes shift can be influenced by the kind of the substituents and the value of m. They are excellently suitable for multicolor applications. Moreover, such fluorescent markers do not only have a large Stokes shift, but are also characterized by a high fluorescence quantum yield in the red spectral range. Therefore, they are characterized by having the advantages of fluorescent markers with a high fluorescence quantum yield in the red spectral range (e.g. Cy-5, DY-630) and those having a large Stokes shift. In addition, the fluorescence quantum yield of the present compounds is sensitive towards proteins so that they are excellently suitable for dyeing proteins (proteinstain) in a non-covalent manner. To achieve an optimal signal-to-noise ratio, the emission bands should be in a range >520 nm, and the excitation should be achievable in the simplest possible way, by white light or laser radiation in the UV or visible spectral region. The fluorophores must have a high fluorescence output, independent of the pH value and other environmental influences. A prerequisite for covalent binding is the presence of a reactive function such that the reaction with the biomolecule to be labelled occurs under physiological conditions, or under the reaction conditions customary in the solid-phase synthesis of bio-oligomers.

The present invention describes polymethine-based compounds, particularly marker dyes with the general formulas I or II or III:

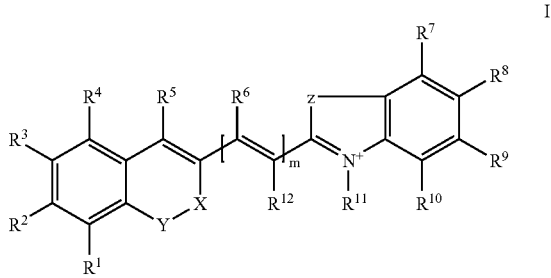

m = 0, 1, 2, 3

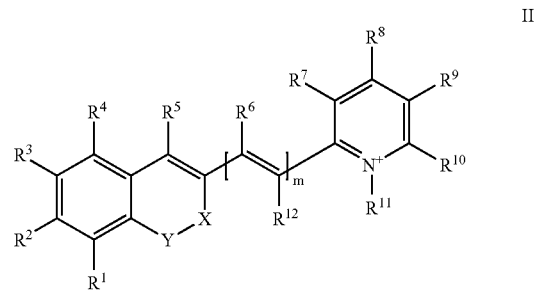

m = 0, 1, 2, 3

-continued

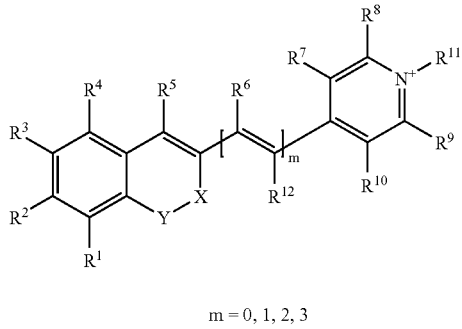

m = 0, 1, 2, 3 where
R$^1$-R$^{12}$ are the same or different and can be any of the following: hydrogen, one or more chlorine and/or bromine atoms, alkyl, aryl, heteroaryl, cycloalkyl, heterocycloalkyl, alkyloxy, alkylmercapto, aryloxy, arylmercapto, heteroaryloxy, heteroarylmercapto or cyano residues, one or more alkyl-substituted or cyclic amino functions, preferably those which have at most 12 carbon atoms, one or more hydroxy functions, R$^1$ and R$^2$ and/or R$^3$ and R$^4$ and/or R$^7$ and R$^8$ and/or R$^9$ and R$^{10}$ can form additional aliphatic or aromatic rings, and/or two adjacent residues (e.g. R$^5$ and R$^6$, and in examples I or II R$^{11}$ and R$^{12}$), together can form one or more aliphatic or aromatic rings, preferably at most two rings, one or more of the substituents R$^1$-R$^{12}$ can be solubilizing or ionizable or ionized substituents such as SO$_3^-$, PO$_3^{2-}$, CO$_2^-$, O$^-$, NR$_3^+$, cyclodextrin or sugar, which determine the hydrophilic properties of the dyes, and it is also possible for these substituents to be bound to the actual chromophore via an aliphatic or heteroaliphatic, possibly cyclic spacer group, at least one of the substituents R$^1$-R$^{12}$ stands for a reactive group of the type isocyanate, isothiocyanate, hydrazine, amine, mono- and dichloro- or mono- and dibromotriazine, aziridine, sulfonyl halide, N-hydroxysuccinimide ester, imido ester, glyoxal or aldehyde, or maleimide or iodacetamide and phosphoramidite, and the substituent in each case being unchanged or bound to the actual basic chromophore via an aliphatic or heteroaliphatic, possibly cyclic spacer group, X—Y together can stand for an element of the group O, S, Se, Te or the structural element (CR$_2$)$_n$, NR or SO$_2$, wherein R can take on the same one or different ones of the functions of R$^1$-R$^{12}$, and n can stand for 1-4, X—Y can stand for the structural elements —CR$_2$—O—, —O—CR$_2$—, —CO—O—, —O—CO—, —CO—NR— or —NR—CO—, wherein R can take on the same one or different ones of the functions of R$^1$-R$^{12}$, Z represents the group (CR$_2$)$_p$, wherein R represents equal or different groups of R$_1$ to R$_{12}$, —(CH$_2$)$_r$—COOH or —(CH$_2$)$_r$—SO$_3$H or their dissociable salts, p is an integer of 1 to 4 and r is an integer of 1 to 7, preferably 1 to 5, or a combination of any of these groups, and m is zero or an integer from 1 to 3.

In preferred compounds of the invention m is 1 or Z is C(CH$_3$)$_2$ or m is 1 and Z is C(CH$_3$)$_2$. Moreover, compounds are preferred in which X-Y together represent —CO—O— or —O—. In other preferred compounds R$^5$ is H, OH or alkoxy, preferably with at most 4 carbon atoms, and/or R$^{11}$ is carboxyalkyl, the carboxy group being preferably in ω-position.

Moreover, compounds are preferred wherein one of R$^8$ to R$^{11}$ is or contains a SO$_3^-$-group or R2 is an amino residue, bound to the nucleus by a nitrogen atom which may contain substituents of at most 8 carbon atoms including a carboxyalkyl or a sulfonic acid alkyl. In specific compounds of this type, R$^2$ may also form a ring with R$^1$ and/or R$^3$. Moreover, compounds are preferred in which a carboxyalkyl group, being present as R$^{11}$ or contained in R$^2$, is an ω-carboxyalkyl having 6 carbon atoms. Other preferred compounds are those in which the aliphatic or heteroaliphatic spacer group consists of a structural element —[(CH$_2$)$_a$—W—(CH$_2$)$_b$]$_c$—, wherein W can be the same or different ones of the functions CR$_2$, O, S, SO$_2$, SO$_2$NH, NR, COO, or CONR, R can take on the functions of R$^1$-R$^{12}$, and a and b represent the same or different values in the range 0-18, while c represents the values from 1 to 18.

The substituted polymethine derivatives with the general formulas I-III can be used as dyes for the optical marking of proteins, nucleic acids, oligomers, DNA, RNA, biological cells, lipids, mono-, oligo- and polysaccharides, ligands, receptors, polymers, pharmaceuticals or polymer particles. In order to serve as dyes in systems for the qualitative or quantitative determination of proteins, nucleic acids, oligomers, DNA, RNA, biological cells, lipids, polymers, pharmaceuticals or polymer particles, the substituted polymethine derivatives with the general formulas I-III are coupled by way of the functional groups to an HO—, H$_2$N— or HS-function of the substances to be determined, the coupling reaction of the substituted polymethine derivatives of the general formula I-III suitably being carried out in an organic or aqueous medium, e.g. a dispersion or suspension, but preferably a solution, to yield conjugates comprising substituted polymethine derivatives with the general formulas I-III and biomolecules exhibiting fluorescent properties.

The substituted polymethine derivatives with the general formulas I-III and the systems derived therefrom can be employed with advantage in qualitative and quantitative optical measurement procedures, in particular those based on fluorescence, including immunological tests, hybridization procedures, processes yielding DNA-sequences, chromatographic or electrophoretic methods and high-throughput screening and for the analysis of receptor-ligand interactions on a microarray.

The polymethines with the general formulas I-III can be used as dyes for the optical marking of organic or inorganic identification units, e.g. amino acids, peptides, proteins, antigens, haptens, enzyme substrates, enzyme cofactors, biotin, carotinoids, hormones, neurohormones, neurotransmitters, growth factors, lympholocines, lectins, toxins, carbohydrates, oligosaccharides, polysaccharides, dextrans, nucleic acids, oligonucleotides, DNA, RNA, biological cells, lipids, receptor-binding pharmaceuticals or organic or inorganic polymeric carrier materials.

This marking of the identification units can be achieved by the production of ionic interactions between the markers having the general formulas I-III and the materials to be marked.

Furthermore, it is also possible to produce a covalent bonding of the identification unit or the carrier material to the fluorophore. This coupling reaction can be carried out in aqueous or predominantly aqueous solution and preferably at ambient temperature. By this means a fluorescent probe (conjugate) is produced that can be used for the qualitative or quantitative determination of various biomaterials or other organic and inorganic materials.

Both the compounds with the general formulas I-III and systems derived therefrom can be employed in qualitative and quantitative optical measurement procedures, in particular those based on fluorescence, for the diagnosis of cell properties, in biosensors (point-of-care measurements), for research on the genome (DNA sequencing) and in miniaturization technologies. Typical applications can be found in cytometry and cell-sorting, fluorescence-correlation spectroscopy (FCS), in ultra-high-throughput screening (UHTS), in multicolor fluorescence in situ hybridization (FISH), as protein-stain and in microarrays (DNA and protein chips).

Such a microarray is a raster-like arrangement of molecules immobilized on at least one surface, which can be used to study receptor-ligand interactions. The term "raster-like arrangement" signifies more than two molecules that are different from one another, are situated within a specified area, and in that area are immobilized in different, prespecified regions with known positions.

A receptor is a molecule that has an affinity for a given ligand. Receptors can be naturally occurring or artificially produced molecules. Receptors can be used in pure form or while bound to other species. Receptors can be linked to a binding partner by covalent or non-covalent bonds, either directly or by way of particular coupling mediators.

Examples of receptors that can be detected by means of this invention include agonists and antagonists for cell-membrane receptors, toxins and other poisonous substances, viral epitopes, hormones such as opiates and steroids, hormone receptors, peptides, enzymes, enzyme substrates, agents that function as cofactors, lectins, sugars, oligonucleotides, nucleic acids, oligosaccharides, cells, cell fragments, tissue fragments, proteins and antibodies, but are not limited to the substances listed here.

A ligand is a molecule that is recognized by a particular receptor. Examples of ligands that can be detected by this invention include agonists and antagonists for cell-membrane receptors, toxins and other poisonous substances, viral epitopes, hormones such as opiates and steroids, hormone receptors, peptides, enzymes, enzyme substrates, agents that function as cofactors, lectins, sugars, oligonucleotides, nucleic acids, oligosaccharides, proteins and antibodies, but are not limited to the substances listed here.

By the preparation of asymmetrical polymethines, which comprise on one hand, as a terminal function, a readily derivatizable heterocycle of the type CH-acid compounds, and on the other hand a novel substituted 6-ring heterocycle, in particular the following advantages are achieved:

With suitable substitution, the absorption maxima are in the region of the emission wavelengths of the argon-ion laser (488 nm) or of the conventional laser diodes at 630-730 nm, and the emission maxima observed are in the ranges between 510 and 710, particularly 550 and 660 nm, or 660 and 820 nm, respectively.

Another advantage resides in the fact that the hydrophilic character of the differently emitting fluorophores can be made nearly identical.

General directions for producing the dyes of Examples 1 to 15.

0.2 mmol of the substituted coumarin-3-carbaldehyde, or 0.2 mmol of the benzofuran-2-carbaldehyde, and 0.2 mmol of the corresponding CH-active compound are heated with reflux in 5 ml acetic anhydride for 10 hours. After cooling diethyl ether is added and the resulting precipitate is isolated and purified by column chromatography.

EXAMPLE 1

1-(5-carboxy-pentyl)-2-[(E)-2-(7-diethylamino-2-oxo-2H-chromen3-yl)-vinyl]-pyridinium bromide 0.2 mmol 7-diethylamino-2-oxo-2H-chromen-3-carbaldehyde and 0.2 mmol 1-(5-carboxy-pentyl)-2-methyl-pyridinium bromide are converted according to the general directions above. Column chromatography: $SiO_2$, eluent: ethanol/toluene.

35% yield, MS (ESI+):435 ($M^+$), UV-Vis (in ethanol): $\lambda_{max}$ 480 nm, $\lambda_{em}$ 600 nm

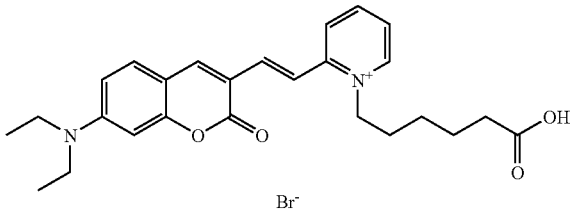

EXAMPLE 2

1-(5-carboxy-pentyl)-2-[(E)-2-(7-diethylamino-2-oxo-2H-chromen-3-yl)-vinyl]-5-sulfonato-pyridinium betaine 0.2 mmol 7-diethylamino-2-oxo-2H-chromene-3-carbaldehyde and 0.2 mmol 1-(5-carboxy-pentyl)-2-methyl-5-sulfonato-pyridinium betaine are converted according to the general directions above. Column chromatography: $SiO_2$ (RP18), eluent: methanol/water.

30% yield, MS (ESI+): 537 ($M+Na^+$), UV-Vis (in water): $\lambda_{max}$ 505 nm, $\lambda_{em}$ 640 nm

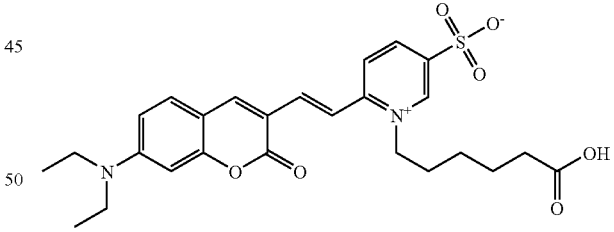

EXAMPLE 3

1-(5-carboxy-pentyl)-4-[(E)-2-(7-diethylamino-2-oxo-2H-chromen-3-yl)-vinyl]-pyridinium bromide 0.2 mmol 7-diethylamino-2-oxo-2H-chromene-3-carbaldehyde and 0.2 mmol 1-(5-carboxy-pentyl)-4-methyl-pyridinium bromide are converted according to the general directions above. Column chromatography: $SiO_2$, eluent: ethanol/toluene.

42% yield, MS (ESI+): 435 ($M^+$), UV-Vis (in ethanol): $\lambda_{max}$ 500 nm, $\lambda_{em}$ 630 nm

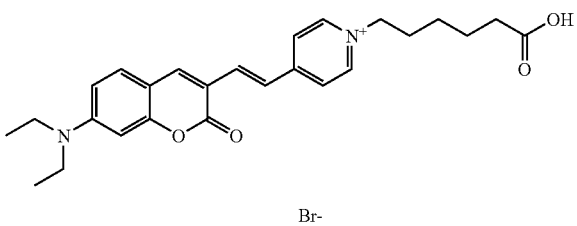

Br-

EXAMPLE 4

1-(5-carboxy-pentyl)-4-((E)-2-{7-[ethyl-(3-sul-fonatopropyl)-amino]-2-oxo-2H-chromen-3-yl}-vinyl)-pyridinium betaine 0.2 mmol 3-[ethyl-(3-formyl-2-oxo-2H-chromen-7-yl)-amino]-propane-1-sulfonic acid sodium salt and 0.2 mmol 1-(5-carboxy-pentyl)-4-methyl-pyridinium bromide are converted according to the general directions above. Column chromatography: $SiO_2$ (RP18), eluent: methanol/water.

28% yield, MS (ESI−): 527 (M−H$^+$), UV-Vis (in water): $\lambda_{max}$ 480 nm, $\lambda_{em}$ 624 nm

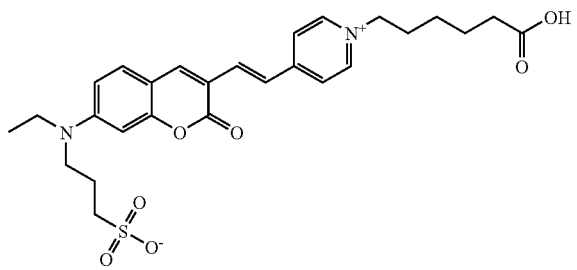

EXAMPLE 5

1-(5-carboxy-pentyl)-4-[(E)-2-(7-diethylamino-2-oxo-2H-chromen-3-yl)-vinyl]-3-sulfonato-pyridinium betaine 0.2 mmol 7-diethylamino-2-oxo-2H-chromene-3-carbaldehyde and 0.2 mmol 1-(5-carboxy-pentyl)-3-sulfonato-4-methyl-pyridinium betaine are converted according to the general directions above. Column chromatography: $SiO_2$ (RP18), eluent: methanol/water.

30% yield, MS (ESI+): 537 (M−Na$^+$), UV-Vis (in water): $\lambda_{max}$ 524 nm, $\lambda_{em}$ 660 nm

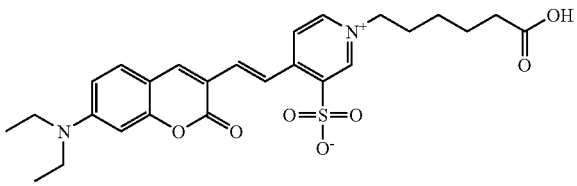

EXAMPLE 6

1-(5-carboxy-pentyl)-4-[(E)-2-(7-diethylamino-4-methoxy-2-oxo-2H-chromen-3-yl)-vinyl]-3-sulfonato-pyridinium betaine 0.2 mmol 7-diethylamino-4-(1-morpholino)-2-oxo-2H-chromene-3-carbaldehyde and 0.2 mmol 1-(5-carboxy-pentyl)-3-sulfonato-4-methyl-pyridinium betaine are converted in methanol in the presence of triethylamine. Column chromatography: $SiO_2$ (RP18), eluent: methanol/water.

10% yield, MS (ESI+): 567 (M−Na$^+$), UV-Vis (in water): $\lambda_{max}$ 505 nm, $\lambda_{em}$ 645 nm

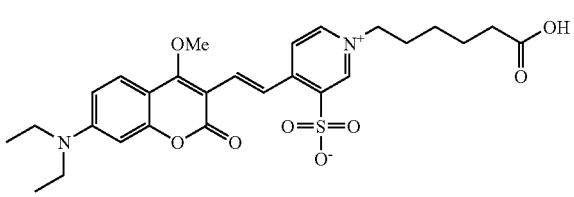

EXAMPLE 7

1-(5-carboxy-pentyl)-4-[(E)-2-(7-diethylamino-4-hydroxy-2-oxo-2H-chromen-3-yl)-vinyl]-3-sulfonato-pyridinium betaine 0.2 mmol 7-diethylamino-4-(1-morpholino)-2-oxo-2H-chromene-3-carbaldehyde and 0.2 mmol 1-(5-carboxy-pentyl)-3-sulfonato-4-methyl-pyridinium betaine are converted in a methanol/water mixture in the presence of triethylamine. Column chromatography: $SiO_2$ (RP 18), eluent: methanol/water.

15% yield, MS (ESI−): 529 (M−H$^+$), UV-Vis (in water): $\lambda_{max}$ 500 nm, $\lambda_{em}$ 590 nm

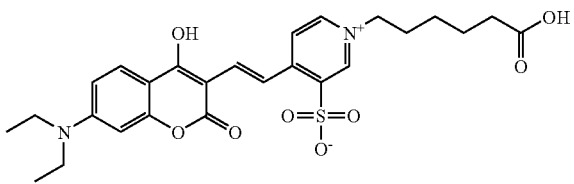

EXAMPLE 8

1-(5-carboxy-pentyl)-2-[(E)-2-(7-diethylamino-4-hydroxy-2-oxo-2H-chromen-3-yl)-vinyl]-3,3-dimethyl-5-sulfonato-3H-indolium betaine 0.2 mmol 7-diethylamino-4-hydroxy-2-oxo-2H-chromene and 0.2 mmol 1-(5-carboxy-pentyl)-3,3-dimethyl-2-((E)-2-phenylamino-vinyl)-5-sulfonato-3H-indolium betaine are converted according to the general directions given herebelow as method 3. Column chromatography: $SiO_2$ (RP 18), eluent: methanol/water.

35% yield, MS (ESI−): 595 (M−H$^+$), UV-Vis (in water): $\lambda_{max}$ 505 nm, $\lambda_{em}$ 600 nm

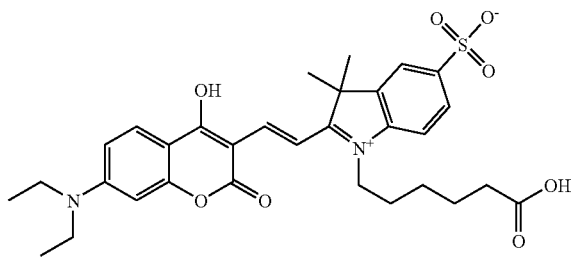

EXAMPLE 9

1-(5-carboxy-pentyl)-4-[(E)-2-(7-diethylamino-2-oxo-2H-chromen-3-yl)-vinyl]-chinolinium bromide 0.2 mmol 7-diethylamino-2-oxo-2H-chromene-3-carbaldehyde and 0.2 mmol 1-(5-carboxy-pentyl)-4-methyl-chinolinium bromide are converted according to the general directions given above.

Column chromatography: $SiO_2$, eluent: ethanol/toluene. 30% yield, MS (ESI+): 485 (M$^+$), UV-Vis (in methanol): $\lambda_{max}$ 540 nm, $\lambda_{em}$ 695 nm

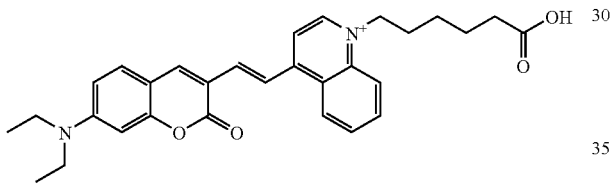

EXAMPLE 10

1-(5-carboxy-pentyl)-4-[(E)-2-(7-diethylamino-2-oxo-2H-chromen-3-yl)-vinyl]-6-sulfo-chinolinium betaine 0.2 mmol 7-diethylamino-2-oxo-2H-chromene-3-carbaldehyde and 0.2 mmol 1-(5-carboxy-pentyl)-4-methyl-6-sulfonato-chinolinium betaine are converted according to the general directions given above. Column chromatography: $SiO_2$ (RP 18), eluent: methanol/water.

20% yield, MS (ESI+): 465 (M+H$^+$) and 587 (M+Na$^+$), UV-Vis (in methanol): $\lambda_{max}$ 555 nm, $\lambda_{em}$ 715 nm

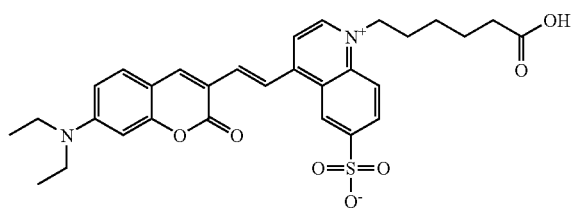

EXAMPLE 11

1-(5-carboxy-pentyl)-2-[(E)-2-(7-diethylamino-2-oxo-2H-chromen1-3-yl)-vinyl]-6-methyl-chinolinium bromide 0.2 mmol 7-diethylamino-2-oxo-2H-chromene-3-carbaldehyde and 0.2 mmol 1-(5-carboxy-pentyl)-4,6-dimethyl-chinolinium bromide are converted according to the general directions given above. Column chromatography: $SiO_2$ (RP18), eluent: methanol/water.

10% yield, MS (ESI+): 499 (M$^+$), UV-Vis (in methanol): $\lambda_{max}$ 520 nm, $\lambda_{em}$ 655 nm

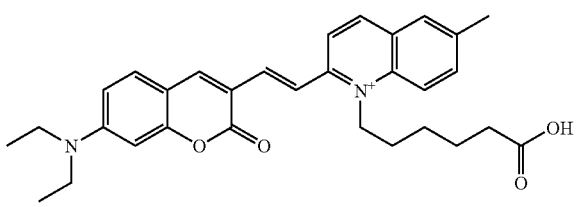

EXAMPLE 12

1-(5-carboxy-pentyl)-2-[(E)-2-(6-diethylamino-benzofuran-2-yl) vinyl]-5-sulfonato-pyridinium betaine 0.2 mmol 6-diethylamino-benzofuran-2-carbaldehyde and 0.2 mmol 1-(5-carboxy-pentyl)-2-methyl-5-sulfonato-pyridinium betaine are converted according to the general directions given above. Column chromatography: $SiO_2$ (RP18), eluent: methanol/water.

10% yield, MS (ESI+): 487 (M+H$^+$) and 509 (M+Na$^+$), UV-Vis (in water): $\lambda_{max}$ 560 nm, $\lambda_{em}$ 690 nm

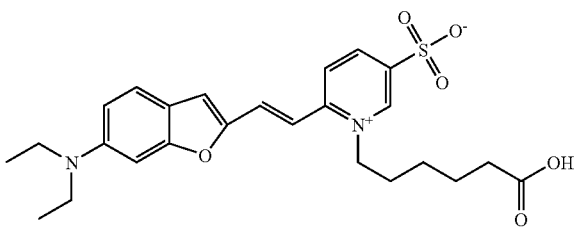

EXAMPLE 13

1-(5-carboxy-pentyl)-4-[(E)-2-(6-diethylamino-benzofuran-2-yl)-vinyl]-3-sulfonato-pyridinium betaine 0.2 mmol 6-diethylamino-benzofuran-2-carbaldehyde and 0.2 mmol 1-(5-carboxy-pentyl) -4-methyl-3-sulfonato-pyridinium betaine are converted according to the general directions given above. Column chromatography: $SiO_2$ (RP 18), eluent: methanol/water.

15% yield, MS (ESI+): 487 (M+H$^+$) and 509 (M+Na$^+$), UV-Vis (in water): $\lambda_{max}$ 530 nm, $\lambda_{em}$ 730 nm

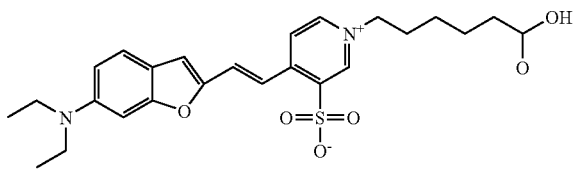

EXAMPLE 14

1-(5-carboxy-pentyl)-4-[(E)-2-(6-diethylamino-benzofuran-2-yl)-vinyl]-6-sulfonato-chinolinium betaine 0.2 mmol 6-diethylamino-benzofuran-2-carbaldehyde and 0.2 mmol 1-(5-carboxy-pentyl)-4-methyl-6-sulfonato-chinolinium betaine are converted according to the general directions given above. Column chromatography: SiO$_2$ (RP18), eluent: methanol/water.

18% yield, MS (ESI+): 537 (M+H$^+$) and 559 (M+Na$^+$), UV-Vis (in methanol): $\lambda_{max}$ 630 nm, $\lambda_{em}$ 800 nm

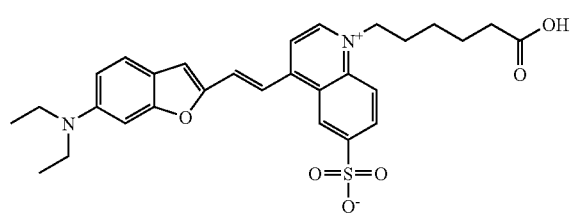

EXAMPLE 15

1-(5-carboxy-pentyl)-2-[(E)-2-(6-diethylamino-benzofuran-2-yl)-vinyl]-3,3-dimethyl-5-sulfonato-3H-indolium betaine 0.2 mmol 6-diethylamino-benzofuran-2-carbaldehyde and 0.2 mmol 1-(5-carboxy-pentyl)-2,3,3-trimethyl-5-sulfonato-3H-indolium betaine are converted according to the general directions given above. Column chromatography: SiO$_2$ (RP18), eluent: methanol/water.

12% yield, MS (ESI+): 553 (M+H$^+$) and 575 (M+Na$^+$), UV-Vis (in water): $\lambda_{max}$ 650 nm, $\lambda_{em}$ 715 nm

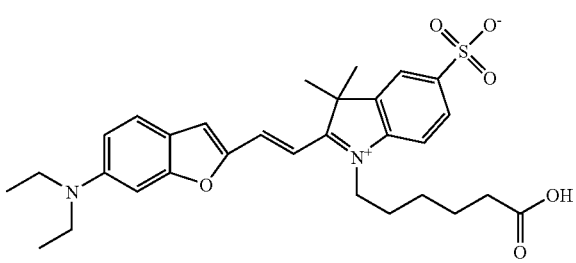

General Preparation Method 2 for the Dyes of Examples 16-18:

0.2 mmol substituted aldehyde and 0.2 mmol of the corresponding substituted CH-acidic compound are dissolved in 5 ml methanol and 20 μl piperidine are added thereto. The mixture is heated for 10 hours on reflux, the solvent is removed and the residue is dried in vacuo. Purification is effected chromatographically.

EXAMPLE 16

4-{7-[(5-carboxy-pentyl)-ethyl-amino]-2-oxo-2H-chromen-3-yl}-1-(3-propylsulfonato)-pyridinium betaine 6-[ethyl-(4-formyl-3-hydroxy-phenyl)-amino]-1-hexane acid and 4-ethoxycarbonylmethyl-1-(3-propylsulfonato)-pyridinium betaine are reacted according to the general method 2.

Column chromatography: SiO$_2$ (RP18), eluent: methanol/water. Yield: 22 mg (21%) deep red powder MS (ESI-): 501 [M]$^-$; 1003 [2M-H]$^-$; MS (ESI+): 503 [M+H]$^+$; 525 [M+Na]$^+$; 547 [M-H+2Na]$^+$, UV-Vis (in water); $\lambda_{max}$ 482 nm, $\lambda_{em}$ 560 nm, $\epsilon$=48,000 1/mol*cm

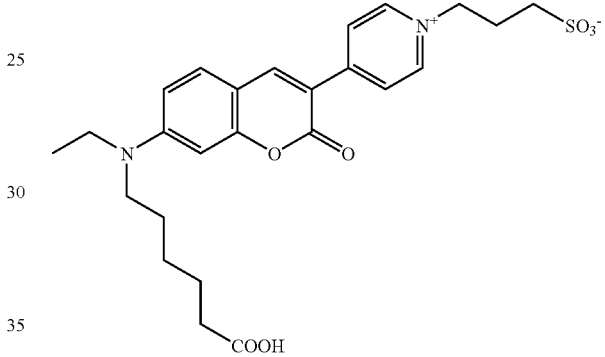

EXAMPLE 17

1-(5-carboxy-pentyl)-4-[5,7,7-trimethyl-2-oxo-8-(3 propylsulfonato)-7,8-dihydro-2H-1-oxa-8-aza-anthracene-3-yl]pyridinium betaine 3-(6-formyl-7-hydroxy-2,2,4-trimethyl-2H-chinolin-1-yl)-1-propanesulfonate Na salt and N-(6-carboxyethyl-hexyl)-4-pyridinium-ethyl acetate-mesylate are reacted according to the general method 2.

Column chromatography: SiO$_2$ (RP18), eluent: methanol/water. Yield: 18 mg (15%) deep red powder MS (ESI-): 553 [M]$^-$, MS (ESI+): 577 [M+Na]$^+$; 599 [M-H+2Na]$^+$, UV-Vis (in water): $\lambda_{max}$ 493 nm, $\lambda_{em}$ 585 nm, $\epsilon$=40,000 1/mol*cm

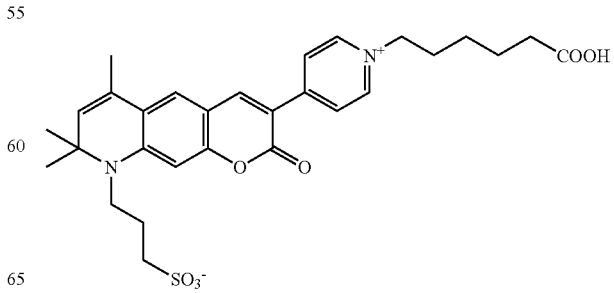

EXAMPLE 18

2-{7-[(5-carboxy-pentyl)-ethyl-amino]-2-oxo-2H-chromen-3-yl}-1-(3-propylsulfonato)-pyridinium betaine 3-(6-formyl-7-hydroxy-2,2,4-trimethyl-2H-quinoline-1-yl) 1-propanesulfonate Na salt and N-(3-propylsulfonato)-2-pyridinium-acetonitrile betaine are converted according to the general method 2. The raw product is boiled 3 hours under reflux in a mixture of 5 ml water and 0.2 ml concentrated HCl. The mixture is neutralised by the addition of diluted NaOH, the solvent removed and the residue purified chromatographically.

Column chromatography: $SiO_2$ (RP18), eluent: methanol/water. Yield: 45 mg (48%) orange yellow powder MS (ESI−): 501 [M−H]$^-$; 523 [M−2H+Na]$^-$, MS (ESI+): 525 [M+Na]$^+$; 547 [M−H+2Na]$^+$, UV-Vis (in water): $\lambda_{max}$ 440 nm, $\lambda_{em}$ 494 nm, $\epsilon$=40,000 1/mol*cm

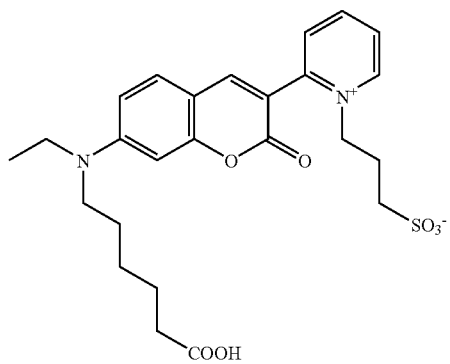

General Preparation Method 3 for the Dyes of Examples 1 to 15, 19 and 20:

0.2 mmol of the substituted coumarin-3-carbaldehyde or benzofurane-2-carbaldehyde and 0.2 mmol of the corresponding CH-acidic compound or 0.2 mmol of the substituted 4-hydroxycoumarin as CH-acidic compound and 0.2 mmol of the corresponding enolether or enamine are boiled in 5 ml acetanhydride on the reflux. The mixture is cooled after 10 hours and diethylether is added. The resulting precipitation is isolated and purified by column chromatography.

EXAMPLE 19

3-(3carboxy-propyl)-2-[4-(7-diethylamino-4-hydroxy-2-oxo-2-H-chrom-en-3-yl)-buta-1,3-dienyl]-3-methyl-5-sulfonato-1-(3propylsulfonato)-3H-indolium sodium salt 7-diethylamino-4-hydroxy-coumarin and 3-(3-ethoxycarbonyl propyl)-3-methyl-2-(4-phenyl-amino-buta-1,3-dienyl)-5-20sulfonato-1-(3-propylsulfonato)-3H-indolium sodium salt are reacted according to the general method 3.

Column chromatography: $SiO_2$ (RP 18), eluent: methanol/water. Yield: 23 mg (15%) deep blue powder MS (ESI−): 350 ($M^{2-}/2$), UV-Vis (in water): $\lambda_{max}$ 606 nm, $\lambda_{cm}$ 67 nm 21

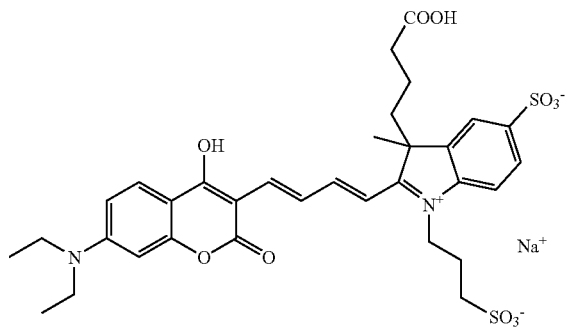

EXAMPLE 20

1-(5-carboxy-pentyl)-2-[4-(7-diethylamino-4-hydroxy-2-oxo-2H-chromen-3-yl)-buta-1,3-dienyl]-3,3-dimethyl-5-sulfonato-3H-indolium betaine 7-diethylamino-4-hydroxy-coumarin and 1-(5-carboxy-pentyl)-3,3-dimethyl-2-(4-phenyl-amino-buta-1,3-dienyl)-5-sulfonato-3H-indolium betaine are reacted according to the general method 3.

Column chromography: $SiO_2$ (RP18), eluent: methanol/water. Yield 20 mg (15%) deep blue powder MS (ESI−): 621 (M$^-$); 643 [M−2H+Na]$^-$, MS (ESI+); 667 [M−H+2Na]$^+$, UV-Vis (in water): $\lambda_{max}$ 606 nm, $\lambda_{cm}$ 665 nm, $\epsilon$=180,000 1/mol*cm

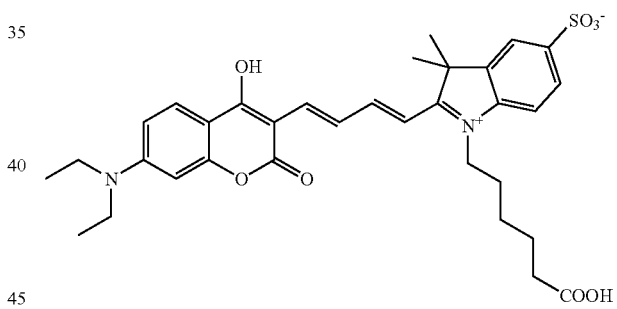

The invention claimed is:
1. A compound having a general formula:

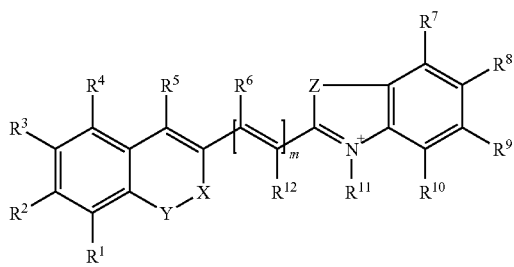

wherein
Z is C substituted with alkyl and optionally substituted with carboxyalkyl;
$R^2$ is alkyl-substituted amino;
$R^5$ is H or OH;

$R^8$ is $SO_3^-$;
$R^{11}$ is alkyl substituted by COOH or $SO_3^-$;
X—Y is CO—O or X—Y are taken together to represent O;
m is 1 or 2; and
$R^1$, $R^3$, $R^4$, $R^6$, $R^7$, $R^9$, $R^{10}$, and $R^{12}$ are H.

2. The compound according to claim 1, wherein $R^{11}$ is a ω-carboxyalkyl having at most 6 carbon atoms.

3. The compound according to claim 1, wherein Z is $C(CH_3)_2$.

4. The compound according to claim 1, wherein $R^2$ contains at most 8 carbon atoms.

5. The compound according to claim 1, wherein $R^2$ is dialkyl-substituted amino.

6. The compound according to claim 1, wherein $R^5$ is OH.

7. The compound according to claim 1, wherein X—Y is CO—O.

8. The compound according to claim 1, wherein X—Y are taken together to represent O.

9. The compound according to claim 1, wherein the compound is

10. The compound according to claim 1, wherein the compound is

11. The compound according to claim 1, wherein the compound is

12. The compound according to claim 1, wherein the compound is

* * * * *